United States Patent
Wang et al.

(10) Patent No.: US 7,634,658 B2
(45) Date of Patent: Dec. 15, 2009

(54) METHOD FOR LOGICALLY BINDING AND VERIFYING A SUBASSEMBLY IN EQUIPMENT

(75) Inventors: Zhengwei Wang, Shenzhen (CN); Guzheng Wu, Shenzhen (CN); Yang Huang, Shenzhen (CN); Zhaohui Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 387 days.

(21) Appl. No.: 11/609,571

(22) Filed: Dec. 12, 2006

(65) Prior Publication Data

US 2007/0143609 A1  Jun. 21, 2007

Related U.S. Application Data

(63) Continuation of application No. PCT/CN2005/01136, filed on Jul. 28, 2005.

(30) Foreign Application Priority Data

Jul. 28, 2004  (CN)  .................. 2004 1 0071100

(51) Int. Cl.
*H04L 9/32* (2006.01)
(52) U.S. Cl. ........................................ 713/169; 726/17
(58) Field of Classification Search ................ 370/464, 370/465, 254, 255; 710/1, 36, 100, 107; 455/403, 410, 411, 73, 550.1, 556.1, 556.2, 455/557, 572, 573; 726/2, 16, 17, 18, 19, 726/21, 34, 35; 713/150, 168, 170, 182, 713/183, 184, 185, 186; 320/106
See application file for complete search history.

(56) References Cited

U.S. PATENT DOCUMENTS

| 5,537,544 | A | * | 7/1996 | Morisawa et al. .............. 726/19 |
| 5,590,198 | A | * | 12/1996 | Lee et al. ....................... 705/61 |
| 6,463,540 | B1 | * | 10/2002 | Lelong et al. .................. 726/17 |
| 2002/0091946 | A1 | * | 7/2002 | Satoh .......................... 713/202 |
| 2002/0129284 | A1 | | 9/2002 | Kobayashi |
| 2003/0009680 | A1 | | 1/2003 | Kiiveri |
| 2004/0005911 | A1 | | 1/2004 | Guirauton et al. |

(Continued)

FOREIGN PATENT DOCUMENTS

CN  1620165 A  5/2005

(Continued)

*Primary Examiner*—Seema S Rao
*Assistant Examiner*—Khoa Huynh

(57) ABSTRACT

The present invention discloses a method for logically binding and verifying a subassembly in equipments. The method sets the subassembly in the equipment as a sub-module, and setting a main module in the equipment. the sub-module stores individual information of its own and the main module stores the individual information of the sub-module. The main module sends verification information corresponding to the individual information of the sub-module stored in the main module to the sub-module when the sub-module needs to be verified. The sub-module judges whether the received verification information matches the individual information stored by the sub-module itself after receiving the verification information, if they matches, it is determined that the sub-module is in the legal status, otherwise, it indicates that the sub-module is in the illegal status. The burglarproof technique for the equipment in the present invention can be extended from the level of equipment to the subassemblies, and the present invention has broad applications.

13 Claims, 4 Drawing Sheets

U.S. PATENT DOCUMENTS

| | | | |
|---|---|---|---|
| 2004/0025031 A1* | 2/2004 | Ooi et al. | 713/186 |
| 2005/0010782 A1* | 1/2005 | Ohkubo | 713/182 |
| 2005/0108309 A1* | 5/2005 | Tsuboka et al. | 708/250 |
| 2006/0005023 A1* | 1/2006 | Homer et al. | 713/168 |
| 2006/0020792 A1* | 1/2006 | Weiss | 713/168 |

FOREIGN PATENT DOCUMENTS

| | | |
|---|---|---|
| CN | 1620166 A | 5/2005 |
| EP | 0029894 A2 | 6/1981 |
| EP | 0552392 A1 | 7/1993 |
| EP | 0798620 A2 | 10/1997 |
| JP | 2003-219475 A | 7/2003 |

\* cited by examiner

METHOD FOR LOGICALLY BINDING AND VERIFYING A SUBASSEMBLY IN EQUIPMENT

CROSS-REFERENCE TO RELATED APPLICATIONS

This application is a continuation of International Application No. PCT/CN2005/001136 filed on Jul. 28, 2005. This application claims the benefit of Chinese Patent Application No. 200410071100.X filed on Jul. 28, 2004. The disclosures of the above applications are incorporated herein by reference.

FIELD

The present disclosure relates to security technologies of subassemblies, more particularly to a method for logical binding and verifying subassemblies in equipment.

BACKGROUND

The statements in this section merely provide background information related to the present disclosure and may not constitute prior art.

Nowadays, mobile terminal equipment like mobile phones and portable computers are stolen or robbed frequently, so it is necessary to set up a burglarproof method for mobile terminal equipment. With the burglarproof setting, even if the mobile terminal is stolen or robbed, it cannot be normally used, and the stealer cannot make profit on reselling the mobile terminal either, therefore the theft or robbery of the mobile terminals can be effectively hindered.

However, some subassemblies inside the mobile terminals, such as base-band chips and mobile terminal batteries, are also valuable, so although the illegal user who stole the mobile terminal cannot use the mobile terminal or make profit on reselling the mobile terminal, he can take the mobile terminal apart and make profit on using or reselling those high-valued subassemblies, which affects the burglarproof effect of the mobile terminal. Or, if the mobile terminal is encrypted by an encryption subassembly to prevent it from being stolen, the illegal user who stole the mobile terminal can make the mobile terminal reusable by replacing the encryption subassembly, thereby deriving benefits.

In addition, when a user sends his/her mobile terminal or computer to a maintenance store for servicing, the original subassembly with long operating life of the mobile terminal or the computer may be replaced by a counterfeit subassembly with short operating life, which causes a great loss to the user.

Therefore, it has become an urgent problem at present as how to effectively stop the above-mentioned theft and robbery.

SUMMARY

The present invention provides a method for logically binding and verifying a subassembly in equipment, so as to effectively stop theft and robbery of equipment.

A method for logically binding and verifying a subassembly in equipment includes at least the following steps:

setting the subassembly in the equipment as a sub-module, and setting a main module in the equipment, the sub-module storing individual information of its own and the main module storing the individual information of the sub-module;

the main module obtaining verification information corresponding to the individual information of the sub-module stored in the main module and sending the verification information to the sub-module when the sub-module needs to be verified;

the sub-module judging whether the received verification information matches the individual information stored by itself after receiving the verification information, if the received verification information matches the individual information stored by itself, the sub-module operating normally; otherwise, the sub-module stopping operating.

It can be seen from the technical scheme of the present invention that, the present invention sets the subassembly which needs burglarproof protection in the equipment as a sub-module, and sets a main module in the equipment, with the sub-module storing individual information and the main module storing the individual information of the sub-module. Thus the information of the sub-module is included in the main module, i.e., the subassembly which needs burglarproof protection is bound in the equipment. When the sub-module needs to be verified, the main module sends the verification information corresponding to the individual information of the sub-module stored in the main module to the sub-module, then the sub-module judges whether the received verification information matches the individual information stored by itself, if yes, it is determined that the sub-module is in the legal status; otherwise, it is determined that the sub-module is in the illegal status.

With the method for logically binding and verifying subassemblies in the present invention, if a single subassembly is taken apart from the equipment and installed in another equipment, the main module in the new equipment does not correctly store the individual information of the subassembly which is taken apart from the original equipment, so when the verification step is performed, the obtained verification information corresponding to the individual information of the subassembly does not match the original individual information stored in the subassembly. At this time, the subassembly will confirm that it is in the illegal status and stop operating. Therefore the illegal users can not make profit on reusing the subassemblies even if they have stolen or robbed the valuable subassemblies in the equipment, which can dramatically hinder the theft and robbery phenomenon. Moreover, the burglarproof protection is extended from the level of equipment to the subassembly in the present invention, which can greatly improve the security of the equipment for the user.

In addition, the method of the present invention is not confined to the burglarproof protection of the equipment or the subassemblies, the method can also be used for other multiple purposes, for instance, it can be verified whether the reinstallation is correct or whether the subassembly of certain equipment is installed in another equipment when the subassembly is taken apart from the original equipment or is reinstalled, so the present invention has broad applications.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
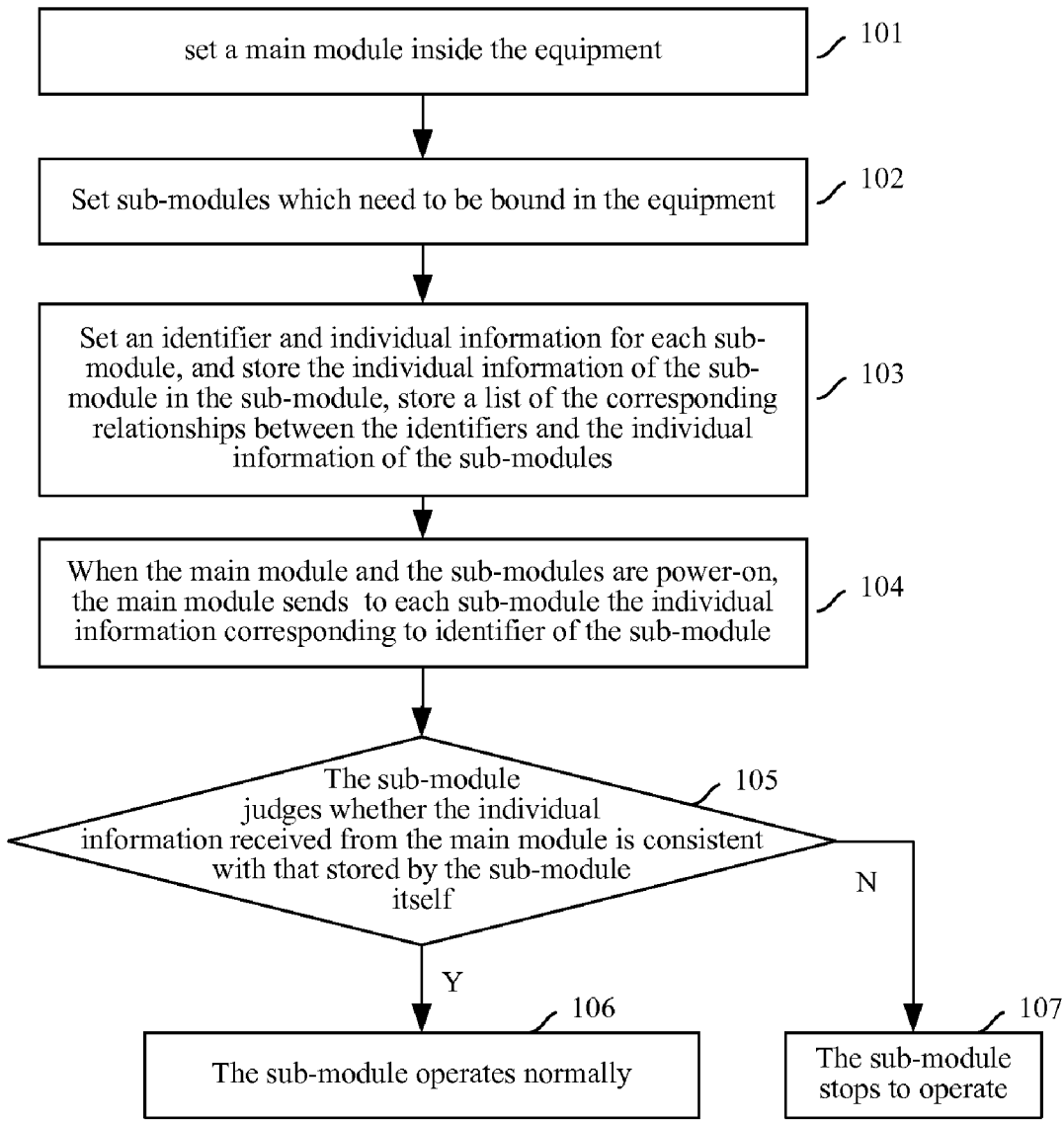
FIG. 1 is a flowchart illustrating a first embodiment of the present invention.

The following description is merely exemplary in nature and is not intended to limit the present disclosure, application, or uses. It should be understood that throughout the drawings, corresponding reference numerals indicate like or corresponding parts and features.

The present invention will be illustrated in detail hereinafter with reference to the accompanying drawings.

Generally, the equipment includes multiple internal subassemblies, for example, a mobile terminal includes a baseband chip, a battery, a display screen and other subassemblies. In order to make sure that those subassemblies cannot be taken apart to apply in other equipment, the key devices are bound in the equipment. In other words, those subassemblies can only be employed in this equipment and cannot operate normally when employed in other equipment. Thus, the burglarproof measure adopted for the whole equipment extends the protection from the equipment level to the subassembly level, which greatly improves the burglarproof effect.

In the present embodiment, each subassembly to be bound inside the equipment is taken as a sub-module, and meanwhile a main module is either set separately or integrated with a certain subassembly in the equipment. The individual information and the sub-module identifier are set for each sub-module respectively, wherein, the individual information is stored in the sub-module itself, and a list of the corresponding relationships between the identifiers and the individual information of the sub-modules is stored in the main module. When the sub-module needs to be verified, the main module will send the individual information of the sub-module to the sub-module, and the sub-module compares the individual information stored by the sub-module itself with that received from the main module and determines whether they are matched, it thereby decides whether to operate normally.

FIG. 1 is a flowchart illustrating the first embodiment of the present invention. As shown in FIG. 1, the method includes the following steps:

Step 101, set a main module inside the equipment, and the main module can be set separately or be integrated with a certain subassembly in the equipment.

Step 102, set the sub-modules which need to be bound in the equipment, i.e. determine which sub-modules need to be bound inside the equipment.

Step 103, set individual information and a sub-module identifier for each sub-module respectively, wherein, the individual information is stored in the sub-module itself, and a list of the corresponding relationship between the identifiers and the individual information of the sub-modules is stored in the main module.

The logical binding of the subassemblies is completed after the above-described Step 101 to Step 103. The logically bound subassemblies will be verified hereinafter.

Step 104, when the main module and the sub-modules are power-on, after a pre-defined time period, the main module sends the individual information corresponding to the identifier of the sub-module to each sub-module.

Step 105, the sub-module judges whether the individual information received from the main module is consistent with that stored in the sub-module itself, if they are consistent, the sub-module passes the verification and operates normally in Step 106; otherwise, the sub-module does not pass the verification and stops operating in Step 107.

The time period pre-defined in Step 104 can be zero, i.e. the main module sends the individual information to the sub-module immediately when it is power-on. If there are multiple sub-modules, the individual information can be sent synchronously or sequentially.

Step 106, when the sub-module passes the verification and operates normally, it can return a notification message to the main module, indicating that the sub-module has passed the verification. In the same way, in Step 107, when the sub-module does not pass the verification and stops operating, it can return a notification message to the main module, indicating that the sub-module has not passed the verification. The main module can either output the messages to the user through the output equipment, e.g. displaying the messages on the display screen, or broadcast the messages to the user by voice, etc.

In addition, another pre-defined time period can be set inside the sub-module, and before Step 105, the method includes a step of judging whether the individual information from the main module is received within the pre-defined time period, if it is received within the pre-defined time period, execute Step 105; if the sub-module does not receive the individual information from the main module within the pre-defined time period, directly execute Step 107, which means that the sub-module has not passed the verification and stops operating.

Except for setting the individual information in the sub-module, individual information can also be set for the main module, so as to effectively prevent the subassembly from being reused by replacing the main module in the equipment and re-binding the subassembly.

Figure 2:
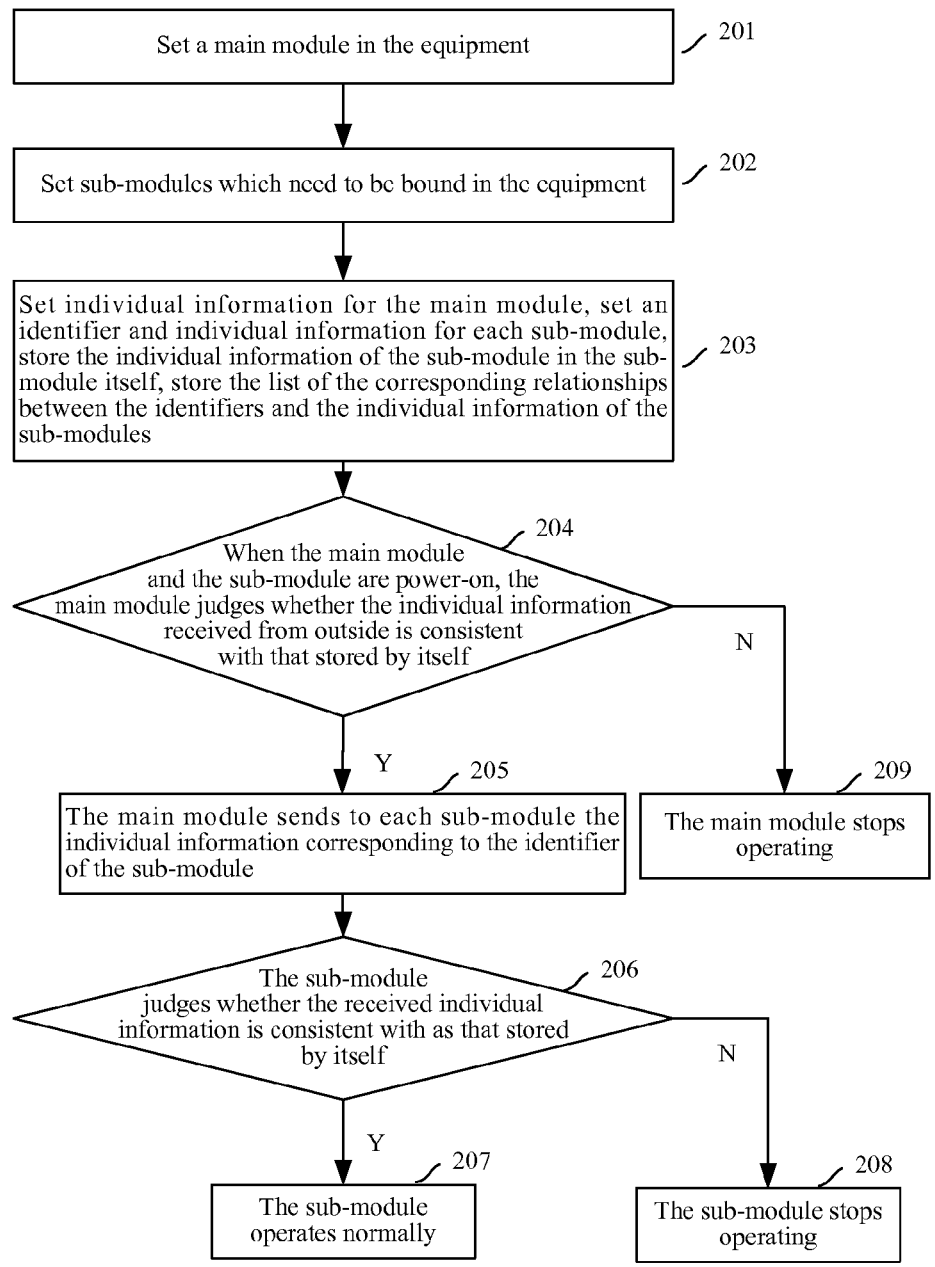
FIG. 2 is a flowchart illustrating a second embodiment of the present invention.

As shown in FIG. 2, the second embodiment of the present invention includes:

Step 201, set a main module inside the equipment, and the main module can be set separately or be integrated with a certain subassembly in the equipment.

Step 202, set the sub-modules which need to be bound in the equipment, i.e. determine which sub-modules need to be bound inside the equipment.

Step 203, set the individual information for the main module, and set the individual information and the sub-module identifier for each sub-module respectively, wherein, store the individual information in the sub-module itself, and store a list of the corresponding relationships between the identifiers and the individual information of the sub-modules in the main module.

The logical binding of the subassembly is completed after the above-described Step 201 to Step 203. The logically bound subassembly will be verified hereinafter.

Step 204, after the main module and the sub-modules are power-on, the main module judges whether the received individual information input from outside is consistent with that stored in the main module, if they are consistent, execute Step 205 and subsequent steps; otherwise, the main module stops operating in Step 209, end the current procedure.

Step 205, the main module sends the individual information corresponding to the identifier of the sub-module to each sub-module.

Step 206, the sub-module judges whether the individual information received from the main module is consistent with that stored in the sub-module itself, if they are consistent, the sub-module passes the verification and operates normally in Step 207; otherwise, the sub-module has not passed the verification and stops operating in Step 208.

In the second embodiment, the input individual information from outside can be input manually by the user from the input unit of the equipment, e.g. input from a keyboard of the mobile terminal, or, set other verification equipment outside the equipment to be verified, and the verification equipment stores the individual information of the main module in the equipment to be verified. The verification equipment sends the individual information to the main module of the equipment to be verified, or, the program module inside the equipment stores the individual information of the main module and sends the individual information to the main module.

the pre-defined time period also can be set in the main module, after the main module is power-on in Step 204, the procedure further includes a step of judging whether the individual information input from outside is received within the pre-defined time period, if it is received within the pre-defined time period, execute the judging step in Step 204; if the main module does not receive the individual information input from outside within the pre-defined time period, directly execute Step 209, i.e. the main module stops operating, and end the current procedure.

Similarly, the sub-module can return the corresponding notification message after Step 207 and Step 208, the main module can generate the notification message indicating the failure of the verification after Step 209, and can output all the notification messages to the user through the output equipment.

Figure 3:
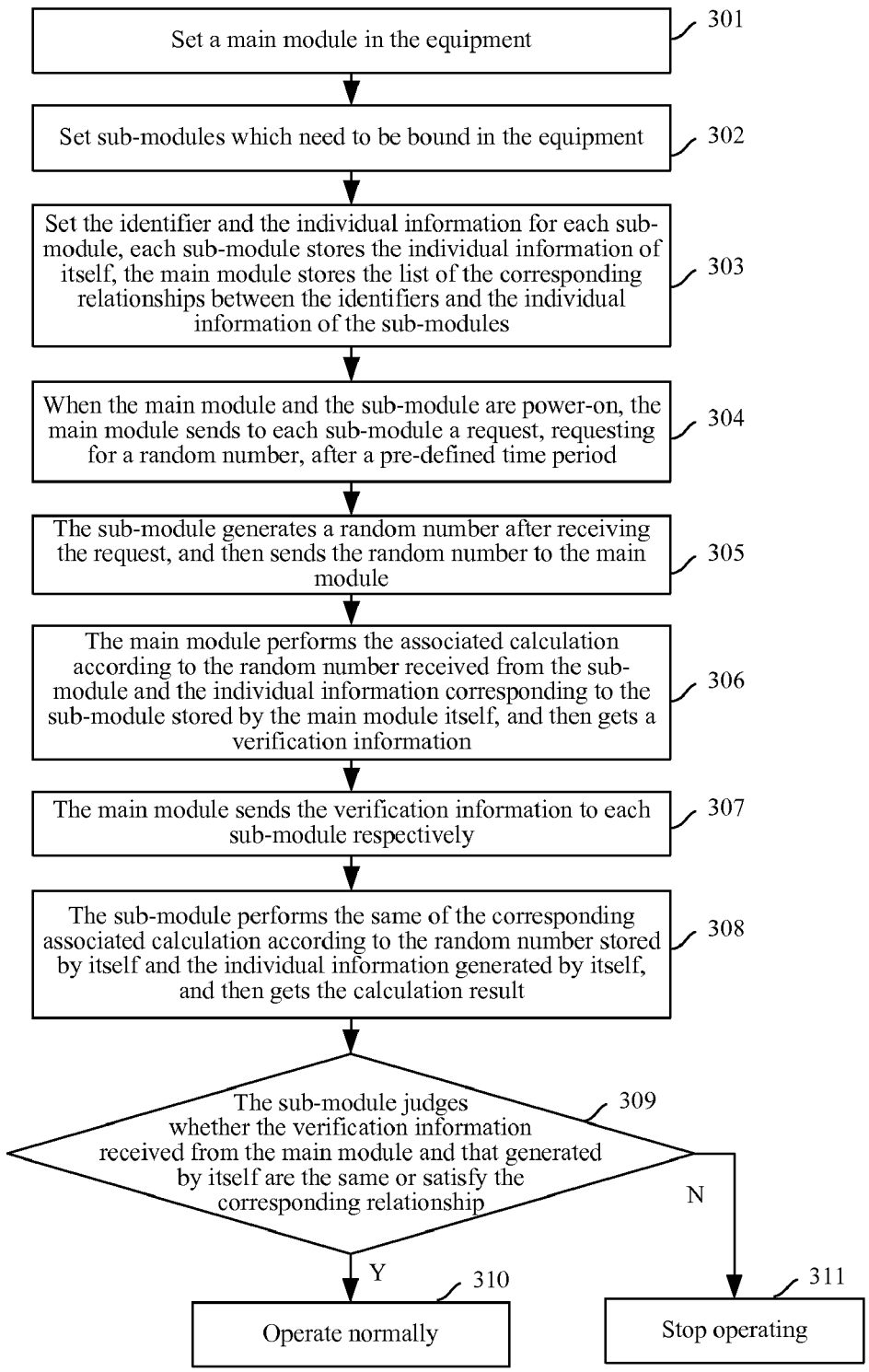
FIG. 3 is a flowchart illustrating a third embodiment of the present invention.

As to the sub-module, the main module can replace the individual information by verification information corresponding to the individual information. For instance, the main module can perform the associated calculation upon the individual information and a random number, and sends the calculated result to the sub-module as the verification information, and the sub-module judges whether the verification information matches the individual information stored in the sub-module itself. Therefore, the third embodiment is provided based on the first embodiment, as shown in FIG. 3. Steps of logical binding in Step 301 to Step 303 are completely the same as those in Step 101 to Step 103 in the first embodiment, which are not to be illustrated herein. The embodiment will be illustrated from the verification procedure in Step 304.

Step 304, when the main module and the sub-modules are power-on, the main module sends a request message, requesting for a random number, to each sub-module after the pre-defined time period.

Step 305, each sub-module generates a random number after receiving the request message, and then sends the random number to the main module.

Step 306, the main module performs the associated calculation according to the random number received from each sub-module and the stored individual information of the sub-module, and then obtains a calculated result, which is the verification information corresponding to the individual information.

Step 307, the main module sends the verification information to each sub-module.

The step of the sub-module judging whether the verification information sent by the main module matches the individual information stored in the sub-module itself after receiving the verification information, further includes the following steps:

Step 308, the sub-module performs the same or the corresponding associated calculation according to the stored random number and the individual information generated by the sub-module itself, and then obtains a calculated result, which is the verification information corresponding to the individual information stored by the sub-module itself.

Step 309, the sub-module judges whether the verification information received from main module is the same as that generated by the sub-module itself, or whether the information satisfies a corresponding relationship, if they are the same or they satisfy the corresponding relationship, the sub-module has passed the verification and operates normally in Step 310; otherwise, the sub-module has not passed the verification and stops operating in Step 311.

The corresponding associated calculation in Step 308 means that the calculation performed by main module may be different from that by the sub-module if only the two calculations satisfy a pre-defined relationship. For example, one calculated result is of integer times, or has a fixed offset, etc., to the other calculated result. Thus in Step 309, the sub-module can determine whether it passes the verification by judging whether the verification information calculated by itself and that received from the main module satisfy the pre-defined relationships. The associated calculation can also be a digest calculation or an encrypted calculation. For instance, as to the associated calculation of the individual information and the random number, the random number can be encrypted by the individual information, i.e. the main module can use the individual information corresponding to the sub-module to encrypt the random number, and then sends the calculated result to the sub-module. The sub-module decrypts the calculated result with its own individual information after receiving the calculated result, and judges whether the decrypted result is the same as the random number stored by itself, if they are the same, the sub-module operates has passed the verification and normally in Step 310; otherwise, the sub-module has not passed the verification and stops operating in Step 311.

Figure 4:
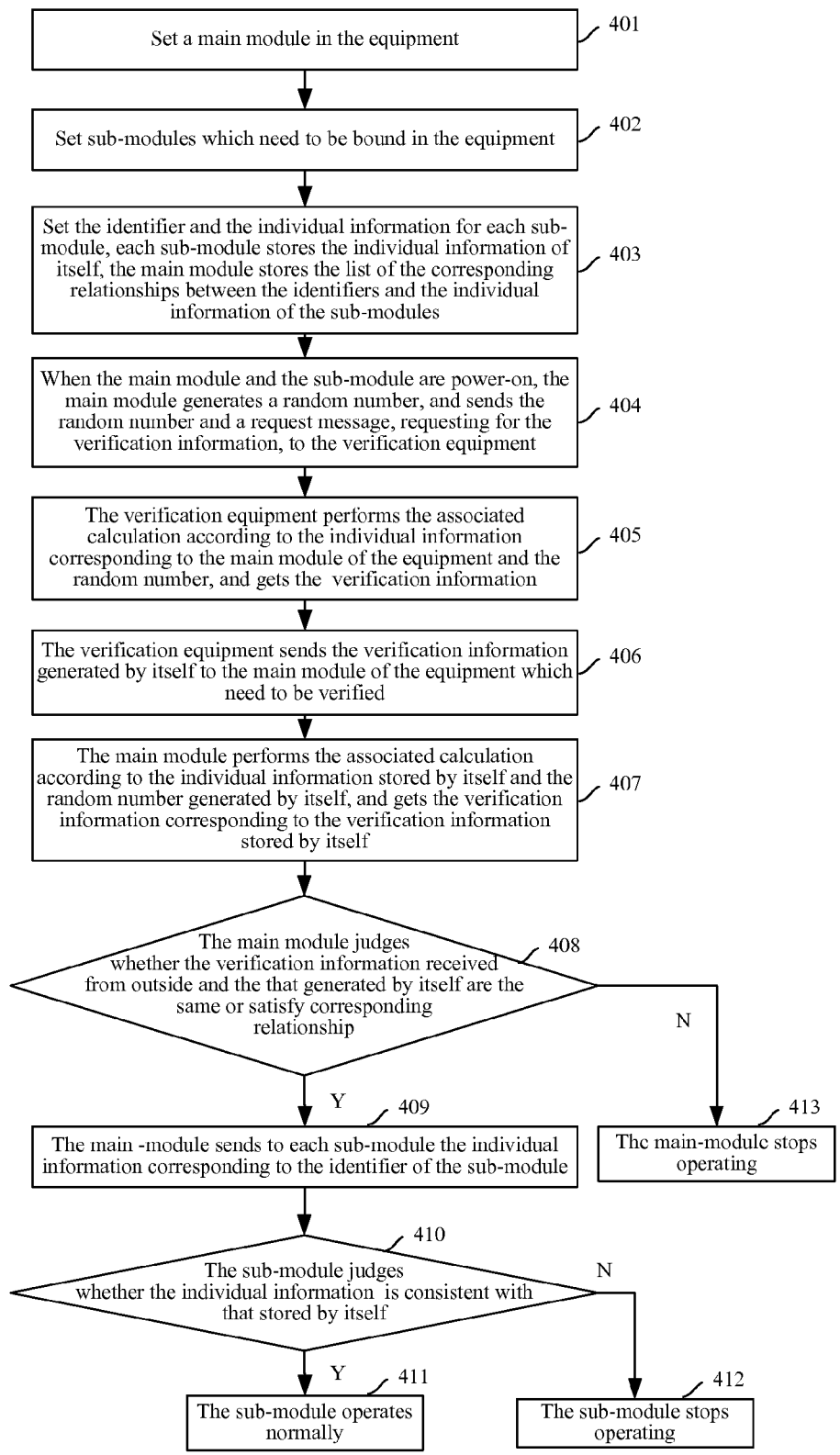
FIG. 4 is a flowchart illustrating a fourth embodiment of the present invention.

Similarly, as to the main module, the individual information can be replaced by verification information corresponding to the individual information. For instance, the associated calculation can be performed upon the individual information and the random number, and the calculated result is sent to the main module as the verification information. And the main module judges whether the verification information matches the individual information stored in the main module itself. Therefore, the fourth embodiment is provided based on the second embodiment. Herein, take the verification equipment as the outside input equipment, as shown in FIG. 4. Steps of logical binding in Step 401 to Step 403 are completely the same as those in Step 201 to Step 203 in the second embodiment, which are not to be illustrated herein. The embodiment will be illustrated from the verification procedure in Step 404.

Step 404, after the main module and the sub-modules are power-on, the main module generates a random number and sends the random number and a request message, requesting for the verification information, to the verification equipment Step 405, the verification equipment performs the associated calculation upon the individual information corresponding to the main module of the equipment and the random number after receiving the request message and the random number, and then obtains the calculated result which is the verification information.

Step 406, the verification equipment sends the verification information generated by itself to the main module of the equipment which needs to be verified.

Step 407, the main module performs the same or the corresponding associated calculation upon the individual information stored in the main module itself and the random number generated by the main module itself after receiving the verification information, so as to obtain the verification information corresponding to the individual information stored by the main module itself.

Step 408, the main module judges whether the received verification information from outside is the same as that generated by the main module itself, or whether they satisfy the corresponding relationship, if they are the same or they satisfy the corresponding relationships, execute Step 409 and subsequent steps; otherwise, the main module stops operating in Step 413, and end the current procedure.

Step 409, the main module sends the individual information corresponding to the identifier of the sub-module to each sub-module.

Step 410, the sub-module judges whether the verification information received from the main module is consistent with that generated by the sub-module itself, if they are consistent, the sub-module has passed the verification and operates normally in Step 411; otherwise, the sub-module has not passed the verification and stops operating in Step 412.

Practically, in the fourth embodiment, the sub-module can also be verified by the verification information obtained by calculating the individual information and the random number.

In the above-mentioned embodiments, the sub-module can send a request message, requesting for the individual information or the verification information, to the main module. The main module sends the individual information or the verification information to the sub-module after receiving the request message. Similarly, the main module can also send the request message, requesting for the individual information or the verification information, to the verification equipment. Or the main module can prompt the user to input the individual information or the verification information through the input unit. Or the main module waits for the outside input individual information of this main module within a pre-defined time period.

In addition, the random number for verifying the sub-module can be generated by the main module and sent to sub-module by the main module, and the random number for verifying the main module can be generated from outside and sent to main module by the outside, wherein, the outside includes the verification equipment, user input, program module, etc.

When the main module and the sub-module interact with each other, the interactive information can be transferred by the main control program module set between the two modules, so that the main module can indirectly interact with each sub-module. Therefore the complexity of the circuit is reduced. In this situation, the sub-module can directly return the verification failure information to the main control program module after failing in the verification, and then the verification failure information will be directly output by the main control program module to the user; therefore, it is not necessary to return the failure information to the main module.

In the present embodiment, a maintenance password can be set in the sub-module, the individual information in the sub-module can be set, modified and cleared and the maintenance password can be re-set through the maintenance password. The sub-module sends the changed individual information to the main module when the sub-module changes its individual information, and then the main module updates the corresponding individual information of the sub-module stored by the main module itself. Moreover, a maximum number of incorrect maintenance password input times can be set, the user can input the maintenance password once again if the first input is incorrect, but if the sub-module receives incorrect maintenance passwords more than the maximum number of incorrect maintenance password input times, the sub-module will stop responding to the subsequent input maintenance passwords or automatically discard itself.

Similarly with the maintenance password in the sub-module, the maintenance password can also be set in the main module, the individual information in the main module can be set, modified and cleared by the user and the maintenance password can be re-set through the maintenance password. The list of information stored by the main module can be obtained through the maintenance password. Moreover, a maximum number of incorrect maintenance password input times can be set, the user can input the maintenance password once again if the first input is incorrect, but if the main module receives incorrect maintenance passwords more than the maximum number of incorrect maintenance password input times, the main module will stop responding to the subsequent input maintenance passwords.

As to the main module, a super maintenance password can be set for the main module, the maintenance password in the main module can be set, modified and cleared and the super maintenance password can be re-set through the super maintenance password. Moreover, a maximum number of incorrect super maintenance password input times can be set, and the user can input the super maintenance password once again if the first input is incorrect, but if the main module receives incorrect super maintenance passwords more than the maximum number of incorrect super maintenance password input times, the main module will stop responding to the subsequent input maintenance passwords. In practical application, the user may forget the maintenance password, so the super password gives the user a chance to remedy it.

The initial value of the maintenance password of the sub-module and the main module can be null, and they can be set when the equipment is logically bound. Specifically, the main module sets the maintenance password and the individual information for the sub-module when performing the binding operation upon the sub-module. Certainly, if the main control program module is employed between the main module and the sub-module to transfer the corresponding interactive information, the maintenance password and the individual information of each sub-module can be set by the main control program module, and they are respectively stored in each sub-module and the main module.

As to the main module, the maintenance password and the individual information of the main module will be set from outside before the main module performs the binding operation upon the sub-module.

In the present embodiment, a maximum number of incorrect verification information input times can be set for the sub-module, the main module can input the maintenance password once again if the first input is incorrect, but if the sub-module receives incorrect maintenance passwords more than the maximum number of incorrect maintenance password input times, and the sub-module will reject the subsequent input by the main module. Similarly, the maximum number of incorrect verification information input times can also be set for the main module, the outside can input the verification information once again if the first input is incorrect, but if the main module receives incorrect verification information more than the maximum number of incorrect verification information input times, the main module will reject the subsequent input from the outside.

In addition, the original individual information of both sub-module and the main module can be modified by inputting correct individual information.

The access control of the individual information, the maintenance password and the super maintenance password can be implemented through logic circuits. This technique is already widely applied in IC card area, and is not to be described herein.

The logical binding and verification technique of the above embodiments can be applied in any electrical products or products including electrical subassemblies, such as mobile phones, computers, household appliances, even cars, etc., so the present invention has broad applications.

To sum up, the above description is just the preferred embodiments of the present invention and not used to confine the protection scope of the present invention.

What is claimed is:

1. A method for logical binding and verifying subassembly in equipment, comprising:
    setting one or more subassemblies in the equipment as one or more sub-modules, and setting a main module in the equipment, each of the one or more sub-modules storing individual information of its own and the main module storing the individual information of the one or more sub-modules;
    setting an identifier for each sub-module to identify the corresponding sub-module; and
    the main module obtaining verification information corresponding to individual information of a first sub-module of the one or more sub-modules stored in the main module and sending the verification information to the first sub-module when the first sub-module needs to be verified, the main module storing a corresponding relationship between the individual information of the one or more sub-modules and the identifiers of the one or more sub-modules;
    wherein the step of the main module sending the verification information to the sub-module comprises: the main module determining the individual information of the sub-module among the individual information of the one or more sub-modules according to the corresponding relationship, and obtaining the verification information corresponding to the individual information of the sub-module and sending the verification information to the sub-module corresponding to the identifier of the sub-module;
    the first sub-module judging whether the received verification information matches the individual information of its own stored in the first sub-module itself after receiving the verification information from the main module, if the received verification information matches the individual information stored in the first sub-module itself, the sub-module operating normally; otherwise, the first sub-module stopping operating; setting individual information of the main module in the main module; and
    before the main module sending to the first sub-module the verification information corresponding to the individual information of the first sub-module, receiving, through an input unit of the equipment or verification equipment outside this equipment, verification information corresponding to the individual information of the main module, and the main module judging whether the received verification information matches the individual information of the main module; if the received verification information matches the individual information of the main module, the main module sending to the first sub-module the verification information corresponding to the individual information of the first sub-module; if the received verification information does not match the individual information of the main module, the main module stopping operating.

2. The method according to claim 1, further comprising:
    when the first sub-module stops operating, the first sub-module sending a notification message to the main module, indicating that the first sub-module is in an illegal status, and then the main module outputting the message to the user through output equipment.

3. The method according to claim 1, further comprising:
    when the main module stops operating, the main module sending a notification message to the user, indicating that the main module is in an illegal status.

4. The method according to claim 1, further comprising:
    setting a maximum number of incorrect verification information input times in at least one of the main module and the one or more sub-modules, and the at least one of the main module and the one or more sub-modules stopping operating when the incorrect verification information input times exceeds the maximum number of incorrect verification information input times.

5. The method according to claim 1, further comprising:
    setting a maintenance password in at least one of the main module and the one or more sub-modules;
    the maintenance password is required to be inputted when setting, modifying or removing the individual information.

6. The method according to claim 5, further comprising:
    setting a maximum number of incorrect maintenance password input times, the at least one of the main module and the one or more sub-modules stopping responding to the subsequent inputted maintenance password when the incorrect maintenance password input times exceeds the maximum number of incorrect maintenance password input times.

7. The method according to claim 5, further comprising:
    setting a super maintenance password in the main module; and
    the super maintenance password is required to be inputted when setting, modifying or clearing the maintenance password.

8. The method according to claim 5, wherein, initial value of the maintenance password of the at least one of the main module and the one or more sub-modules is null; the method further comprising: setting maintenance password for the at least one of the main module and the one or more sub-modules while setting the individual information for the at least one of the main module and one or more the sub-modules.

9. The method according to claim 1, wherein, the verification information received by the at least one of the main module and the first sub-module is the individual information;
    the at least one of the main module and the first sub-module judging whether the received verification information matches the individual information stored in the at least one of the main module and the first sub-module comprises:
    the at least one of the main module and the first sub-module directly comparing the received individual information with the individual information stored in the at least one of the main module and the first sub-module respectively to determine whether they are consistent.

10. The method according to claim 1, wherein, the verification information received by the at least one of the main module and the first sub-module is an associated calculating result of the individual information and a random number, the at least one of the main module and the first sub-module judging whether the received verification information matches individual information stored in the at least one of the main module and the first sub-module comprises:

the at least one of the main module and the first sub-module performing the associated calculation upon the stored individual information and the random number, comparing the obtained calculated result with the received verification information to determine if they are the same or satisfy a pre-defined corresponding relationship.

11. The method according to claim 1, further comprising:

setting a pre-defined time period in the at least one of the main module and the first sub-module;

the at least one of the main module and the first sub-module judging whether the verification information is received within the pre-defined time period, and if the verification information is received with the pre-defined time period, judging whether the received verification information matches the individual information stored by the at least one of the main module and the first sub-module, otherwise, the at least one of the main module and the first sub-module stopping operating.

12. The method according to claim 1, wherein, the equipment of the present invention further comprises a main control program module, which is used for transferring interactive messages between the main module and the sub-modules.

13. The method according to claim 1, wherein, the main module can be set separately in the equipment or be integrated with one subassembly in the equipment.

* * * * *

UNITED STATES PATENT AND TRADEMARK OFFICE
CERTIFICATE OF CORRECTION

PATENT NO. : 7,634,658 B2
APPLICATION NO. : 11/609571
DATED : December 15, 2009
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 390 days.

Signed and Sealed this

Ninth Day of November, 2010

David J. Kappos
*Director of the United States Patent and Trademark Office*